United States Patent [19]
Sugaya

[11] Patent Number: 5,731,800
[45] Date of Patent: Mar. 24, 1998

[54] OUTPUT METHOD AND APPARATUS

[75] Inventor: Akio Sugaya, Yokohama, Japan

[73] Assignee: Canon Kabushiki Kaisha, Tokyo, Japan

[21] Appl. No.: 475,833

[22] Filed: Jun. 7, 1995

Related U.S. Application Data

[63] Continuation of Ser. No. 125,144, Sep. 23, 1993, abandoned, which is a continuation of Ser. No. 778,373, Oct. 17, 1991, abandoned.

[30] Foreign Application Priority Data

Oct. 19, 1990 [JP] Japan ................................. 2-279180
Oct. 19, 1990 [JP] Japan ................................. 2-279181

[51] Int. Cl.$^6$ ......................................................... G06K 1/00
[52] U.S. Cl. ........................... 345/143; 345/195; 395/110
[58] Field of Search ...................................... 345/141, 142, 345/143, 144, 192, 193, 194, 195; 340/731, 735; 400/121; 395/110, 102; 382/301

[56] References Cited

U.S. PATENT DOCUMENTS 4,907,282  3/1990  Daly et al. ............................. 340/731

FOREIGN PATENT DOCUMENTS

| | | |
|---|---|---|
| 1-191192 | 8/1989 | Japan . |
| 1-290448 | 11/1989 | Japan . |
| 2-63855 | 3/1990 | Japan . |
| 2-202461 | 8/1990 | Japan . |

*Primary Examiner*—Steven Saras
*Attorney, Agent, or Firm*—Fitzpatrick, Cella, Harper & Scinto

[57] ABSTRACT

An output apparatus includes a memory for storing attribute information and an output resolution of a character pattern, an outline font forming unit for forming an outline font on the basis of font information in a dot pattern format, a dot pattern forming unit for forming a dot pattern font on the basis of the outline font in accordance with the attribute information and the resolution, and an output unit for displaying and outputting the dot pattern formed by the dot pattern forming unit.

10 Claims, 10 Drawing Sheets

OUTPUT METHOD AND APPARATUS

This application is a continuation of application Ser. No. 08/125,144 filed Sep. 23, 1993, now abandoned, which was a continuation of application Ser. No. 07/778,373 filed Oct. 17, 1991, now abandoned.

BACKGROUND OF THE INVENTION

1. Field of the invention

The present invention relates to a character pattern output apparatus, which can register an outline font obtained by converting dot pattern information, and can display and output a dot pattern obtained by converting the outline font.

2. Related Background Art

In, e.g., a printer for receiving character codes, and printing characters on, e.g., a recording sheet, character pattern information is stored in a font memory in a dot pattern format or an outline format. Upon reception of a character code, corresponding pattern data or outline font is read out from the font memory, and is developed to a dot pattern to perform recording. The pattern development based on the outline font is advantageous since characters can be easily enlarged or reduced. In general, however, font information using a dot pattern is still popular.

When a printer which stores font information in the dot pattern format performs a recording operation while changing a resolution, if a printing operation is performed using character fonts stored in the dot pattern format, characters having different sizes are undesirably printed in accordance with resolutions. For example, when a printing operation is performed at a resolution of 180 dpi (dots/inch), the print size of a character dot pattern constituted by a 25×25 dot matrix is about 10 points (1 point=1/72 inch). However, when this character is printed at a resolution of 360 dpi, the printed character size undesirably becomes about 5 points.

For this reason, in order to print characters having the same size at different resolutions, in, e.g., the above-mentioned case, every time a character is received, an outline font must be temporarily formed based on the 25×25 dot font, and a dot pattern (50 dots×50 dots) must be generated and printed, so that when the formed outline font is printed at a dot density of 360 dpi, the printed character has a size of 10 points.

SUMMARY OF THE INVENTION

It is an object of the present invention to provide an output method and apparatus, which can register an outline font formed based on a dot pattern, and can display and output a dot pattern having a size suitable for a character attribute.

It is another object of the present invention to provide a character pattern output apparatus comprising input means for inputting attribute information of a character, memory means for storing a resolution of a character pattern display output unit, outline font generation means for generating an outline font on the basis of font information in a dot pattern format, storage means for storing the outline font, dot pattern generation means for generating a dot pattern font based on the outline font in accordance with the attribute information and the resolution, and output means for displaying and outputting the pattern generated by the dot pattern generation means.

It is still another object of the present invention to provide an output method and apparatus, which generate an outline font based on font information in a dot pattern format, store the outline font, generate a dot pattern font based on the stored outline font in accordance with attribute data of a corresponding character and a resolution of a display output unit, and display and output the generated pattern.

It is still another object of the present invention to provide an output method and apparatus, which can generate an outline font based on a dot pattern, and can register a dot pattern which is formed to have a size according to a resolution of a recording unit, so that a high-speed output operation can be assured even when the resolution is changed.

It is still another object of the present invention to provide an output apparatus comprising input means for inputting form information of a document, recording means which receives image data formed by a dot pattern, and can record the image data while changing a resolution, first storage means for storing font information of a character as a dot pattern, outline font generation means for generating an outline font based on the dot pattern, outline font storage means for storing the outline font, dot pattern generation means for generating a character dot pattern having a size corresponding to the form information, and a recordable resolution of the recording means on the basis of the outline font, second storage means for storing the dot pattern generated by the dot pattern generation means, and pattern development means for reading out the dot pattern having a size corresponding to the form information and the resolution from one of the first and second storage means, and performing pattern development of the readout pattern to form image data.

It is still another object of the present invention to provide an output method and apparatus which store character font information as a dot pattern, generate and store an outline font based on the dot pattern, and generate and store a character dot pattern having a size corresponding to form information and a recordable resolution of recording means on the basis of the outline font, whereby a corresponding dot pattern is read out and printed in correspondence with designated form information and a resolution.

It is still another object of the present invention to provide an output method and apparatus, which can give a resolution non-dependency to an externally input down-load font.

DETAILED DESCRIPTION OF THE PREFERRED EMBODIMENTS

The preferred embodiment of the present invention will be described in detail below with reference to the accompanying drawings.

<Printer (FIG. 6)>

Figure 6:
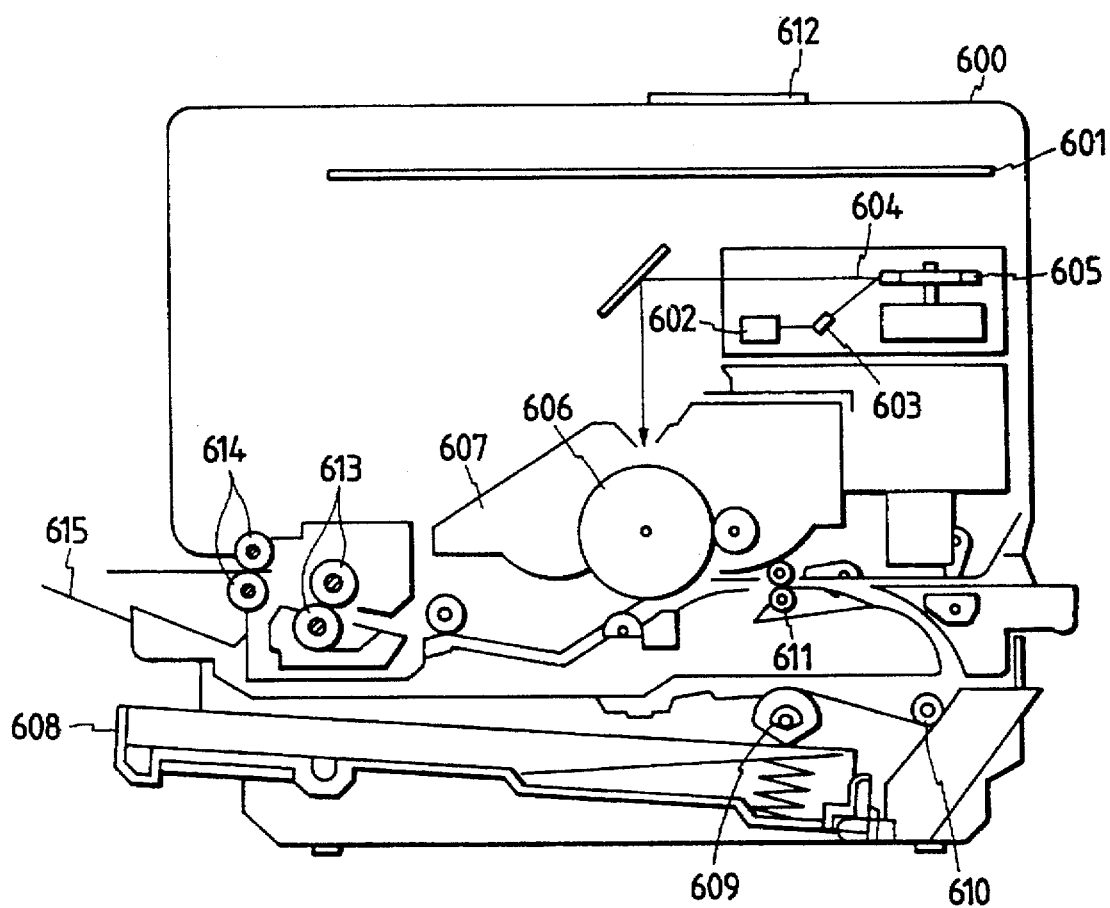
FIG. 6 is a sectional view showing a structure of a printer engine of the LBP of this embodiment.

FIG. 6 is a sectional view showing an internal structure of a laser beam printer (to be abbreviated to as an LBP hereinafter) according to this embodiment. Note that this LBP can register a character pattern (dot pattern data) received from a data source (not shown), and can also register a standard form (form data).

In FIG. 6, an LBP main body 600 can receive and store character information (character code), form information, or a macro command from, e.g., an external host computer, and can form a character pattern or a form pattern according to these pieces of information so as to form an image on a recording sheet as a recording medium. A printer control unit 601 controls the overall LBP 600, and analyzes, e.g., character information supplied from the host computer. The control unit 601 mainly converts character information into a video signal of a corresponding character pattern, and outputs the converted signal to a laser driver 602. An operation panel 612 includes operation switches, LED indicators, and the like.

The laser driver 602 drives a semiconductor laser 603, and turns on/off a laser beam 604 emitted from the semiconductor laser 603 in accordance with an input video signal. The laser beam 604 is deflected by a rotary polygonal mirror 605 in the right-and-left direction in FIG. 6, thus scanning the surface of an electrostatic drum 606. As a result, an electrostatic latent image of a character pattern is formed on the electrostatic drum 606. The electrostatic latent image is developed by a developing unit 607 arranged around the electrostatic drum 606, and is then transferred onto a recording sheet.

As the recording sheet, cut sheets are used. The cut recording sheets are stored in a paper cassette 608 attached to the LBP 600. Each recording sheet is fetched into the apparatus by a paper feed roller 609 and convey rollers 610 and 611, and is fed to the electrostatic drum 606. The recording sheet on which an image is transferred and recorded by the electrostatic drum 606 is exhausted onto a tray 615 by recording sheet exhaust rollers 613 and 614.

A printer engine unit shown in FIG. 6 can change the resolution, and can perform a printing operation at a plurality of resolutions.

<Control Unit 601 (FIG. 1)>

Figure 1:
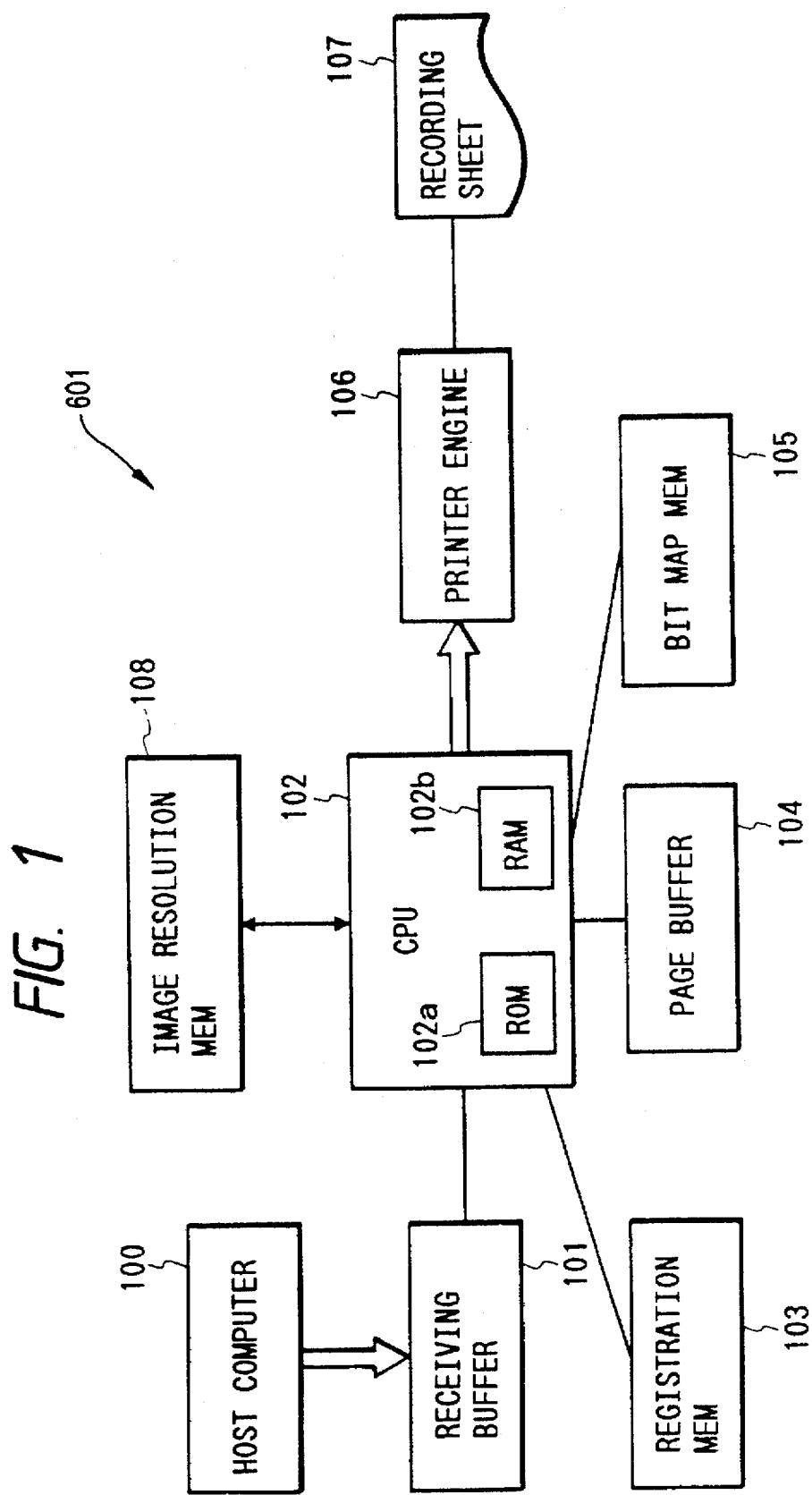
FIG. 1 is a schematic block diagram showing an arrangement of a control unit for an LBP according to an embodiment of the present invention.

FIG. 1 is a block diagram of the control unit 601 for controlling the overall LBP 600.

In FIG. 1, a host computer 100 outputs various data to the LBP 600. A receiving buffer 101 stores data received from the host computer 100. A CPU 102 controls the overall LBP 600, and executes various control operations in accordance with a control program stored in a ROM 102a. A RAM 102b is used as a work area for the CPU 102, and temporarily stores various data.

A registration memory 103 stores an outline font generated based on a registered dot pattern. A page buffer 104 stores data received from the host computer 100 in units of pages. A bit map memory 105 stores an output image for one page to be output to a printer engine 106. The printer engine 106 prints image data stored in the bit map memory 105 on a recording sheet 107. The recording sheet 107 is printed in this manner. A resolution memory 108 stores the current printing resolution of the printer engine 106.

With the above arrangement, when a dot pattern font is input from the host computer 100, it is temporarily converted into an outline font, and the converted outline font is stored in the registration memory 103.

A case will be explained below wherein a character code is input from the host computer 100, a character size, a form, a printing resolution, and the like are instructed, and start of printing is then instructed. In this case, an outline font registered in the registration memory 103 is read out, and is converted into a dot pattern to have a size corresponding to attribute information such as the resolution, form, and the like. The converted dot pattern is developed onto the bit map memory 105 as a bit map image. In this manner, even when various character sizes are designated, a printing operation can be performed with suitable character sizes.

<Management of Outline Font (FIG. 2)>

Figure 2:
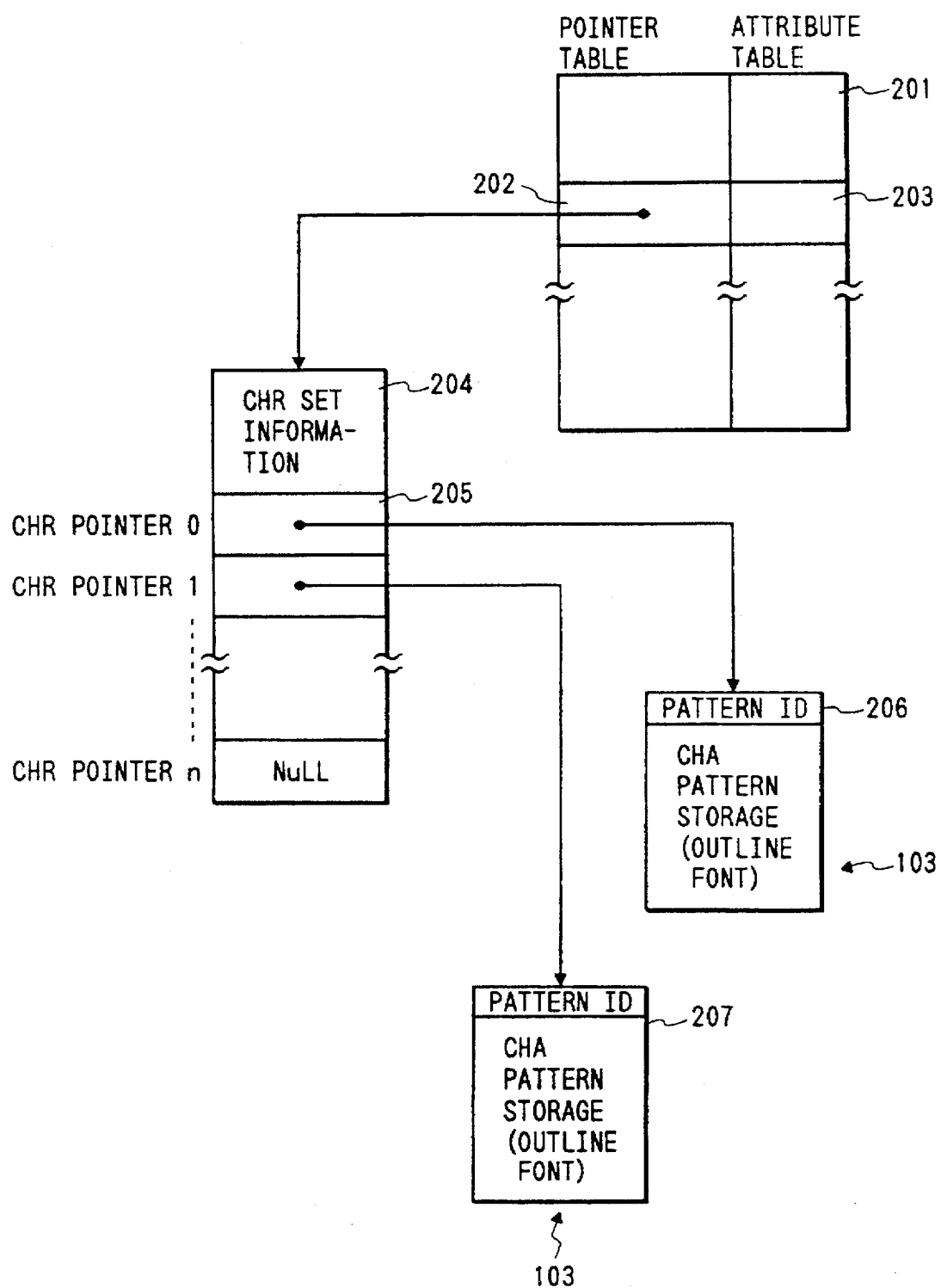
FIG. 2 is a view showing tables which relate font information in the LBP of this embodiment with a character code.

FIG. 2 is a view for explaining management of an outline font generated based on a dot pattern font.

In FIG. 2, a character set management table 201 is used for managing an outline font registered in the registration memory 103. A pointer table 202 indicates a registered character set, and manages all the character sets which can be used in this printer. An attribute storage 203 stores an attribute (Ming type, Gothic type, or the like) of a character set indicated by the pointer table 202, and is used when an outline font is selected, and is pattern-developed.

A registered character set information portion 204 is indicated by the pointer table 202. In the information portion 204, the width, height, attribute, and the like of the character set are described. Character pointers 205 are stored in the character set information portion 204, and respectively store the start addresses of outline fonts (e.g., 206 and 207) registered in the registration memory 103 in correspondence with character codes.

<Character Pattern Registration Processing (FIG. 3)>

Figure 3:
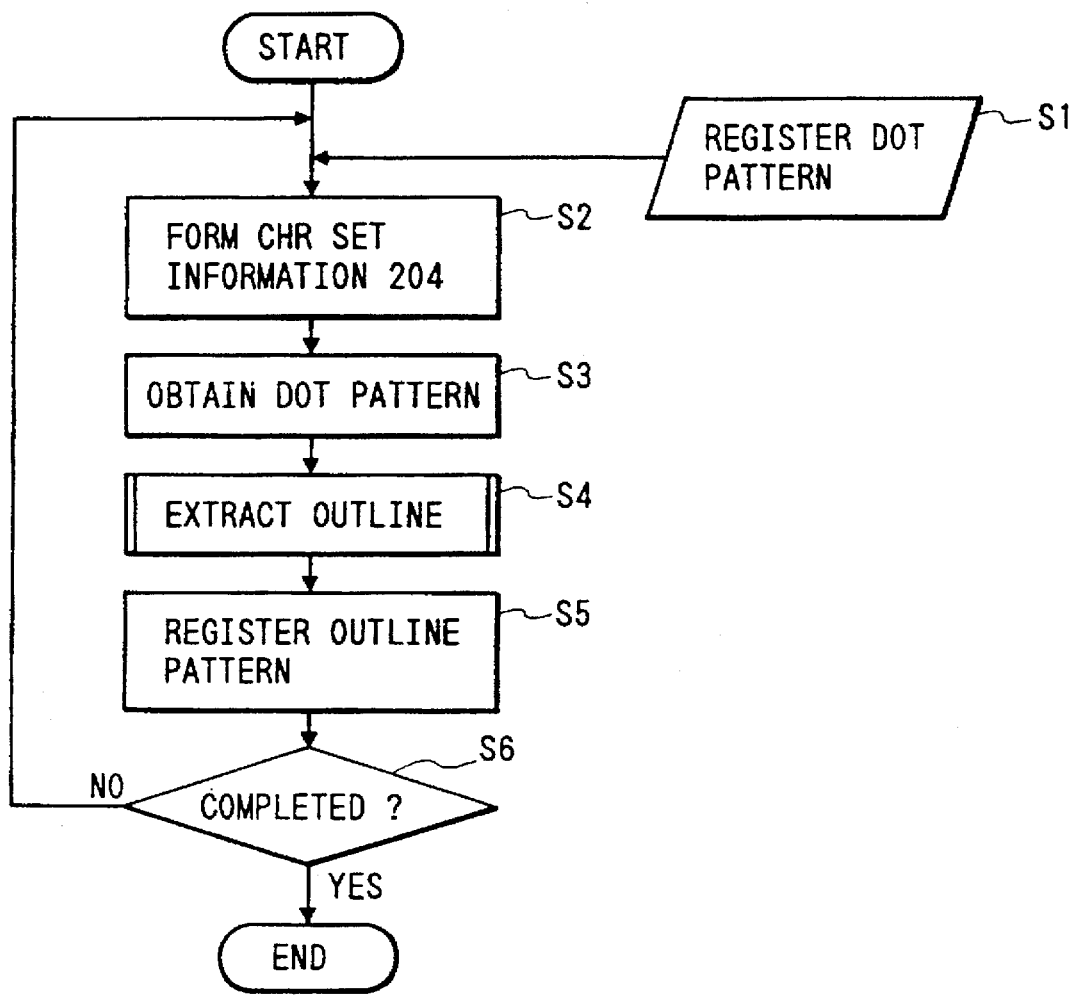
FIG. 3 is a flow chart showing character pattern registration processing in the LBP of this embodiment.

FIG. 3 is a flow chart showing a character pattern registration processing sequence in the LBP 600 of this embodiment. A control program for executing this processing is stored in the ROM 102a. Prior to this processing, registered data of character patterns are already transferred from the host computer 100, and are stored in the receiving buffer 101.

In step S1, character set information for storing a character type, a type face, and the like (FIG. 2) is generated, and its address is stored in the pointer table 202 of the character set management table 201. Furthermore, attribute information such as a character width, a character height, a type face, and the like is stored in the attribute storage 203.

In step S2, the character set information portion 204 is generated, and its address is stored in the pointer table 202 in the character set management table 201. As described above, an outline font registered as will be described later, the character set information portion 204, and the character set management table 201 are related to each other.

In step S3, a dot pattern for one character is read out from the receiving buffer 101. In step S4, outline extraction processing of the dot pattern is executed to extract an outline of a character, thereby generating an outline font.

Thereafter, the flow advances to step S5, and the start address of the outline font stored in the registration memory 103 is stored in the character pointer 205 of the character set information portion 204 in correspondence with a character code. The above-mentioned processing is repeated until registration of all the character patterns sent from the host computer 100 is completed in step S6.

In this manner, the outline fonts generated based on the dot patterns sent from the host computer 100 are registered in the registration memory 103. The start addresses of the outline fonts in the registration memory 103 are stored in the tables 201 and 204 in association with character codes corresponding to the fonts together with pieces of attribute information.

<Printing Processing (FIG. 4)>

Figure 4:
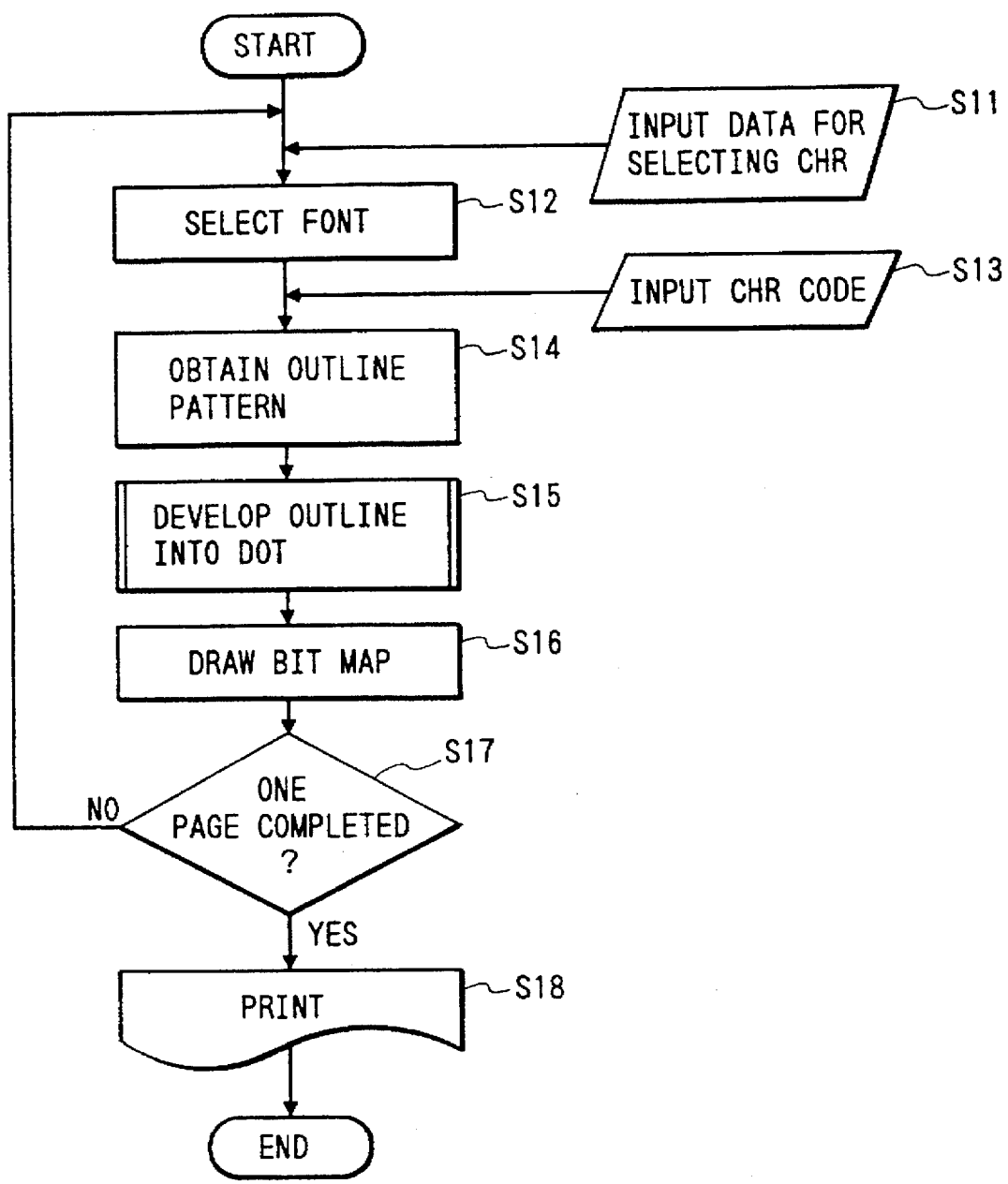
FIG. 4 is a flow chart showing printing processing in the LBP of this embodiment.

FIG. 4 is a flow chart showing a processing sequence for printing registered character patterns by the LBP 600. This control program is stored in the ROM 102a.

In step S11 in FIG. 4, character set information (Ming type, Gothic type, or the like) for selecting characters, and a character form (height and width) are input from the host computer 100. In step S12, a corresponding character set is selected from the character set management table 201 using the character set information input in step S11. In this case, information such as a character height, a character width, and the like in the character set information selected from the character set management table 201 can be different from values input in step S11. Since the outline fonts are registered, they can be converted into dot patterns in correspondence with the attribute information.

The flow then advances to step S13, and a character code received from the host computer 100 is read out from the receiving buffer 101. In step S14, the character pointer, corresponding to the readout character code, of the selected character set information portion 204 is looked up, thereby extracting a corresponding outline pattern font from the registration memory 103.

The flow advances to step S15, and the readout outline font is developed to a dot pattern in accordance with the character form input in step S11, and the printing resolution of the printer engine 106 stored in the resolution memory 108, thus obtaining a desired dot pattern.

The dot pattern obtained in this manner is stored in the bit map memory 105 in step S16. The above-mentioned processing is repeated until bit map data for one page are developed on the memory 105. Upon completion of image data for one page, the flow advances to step S18, and the image data is output to 10 the printer engine 106 shown in FIG. 6, thus printing an image on the recording sheet.

<Another Embodiment (FIG. 5)>

Figure 5:
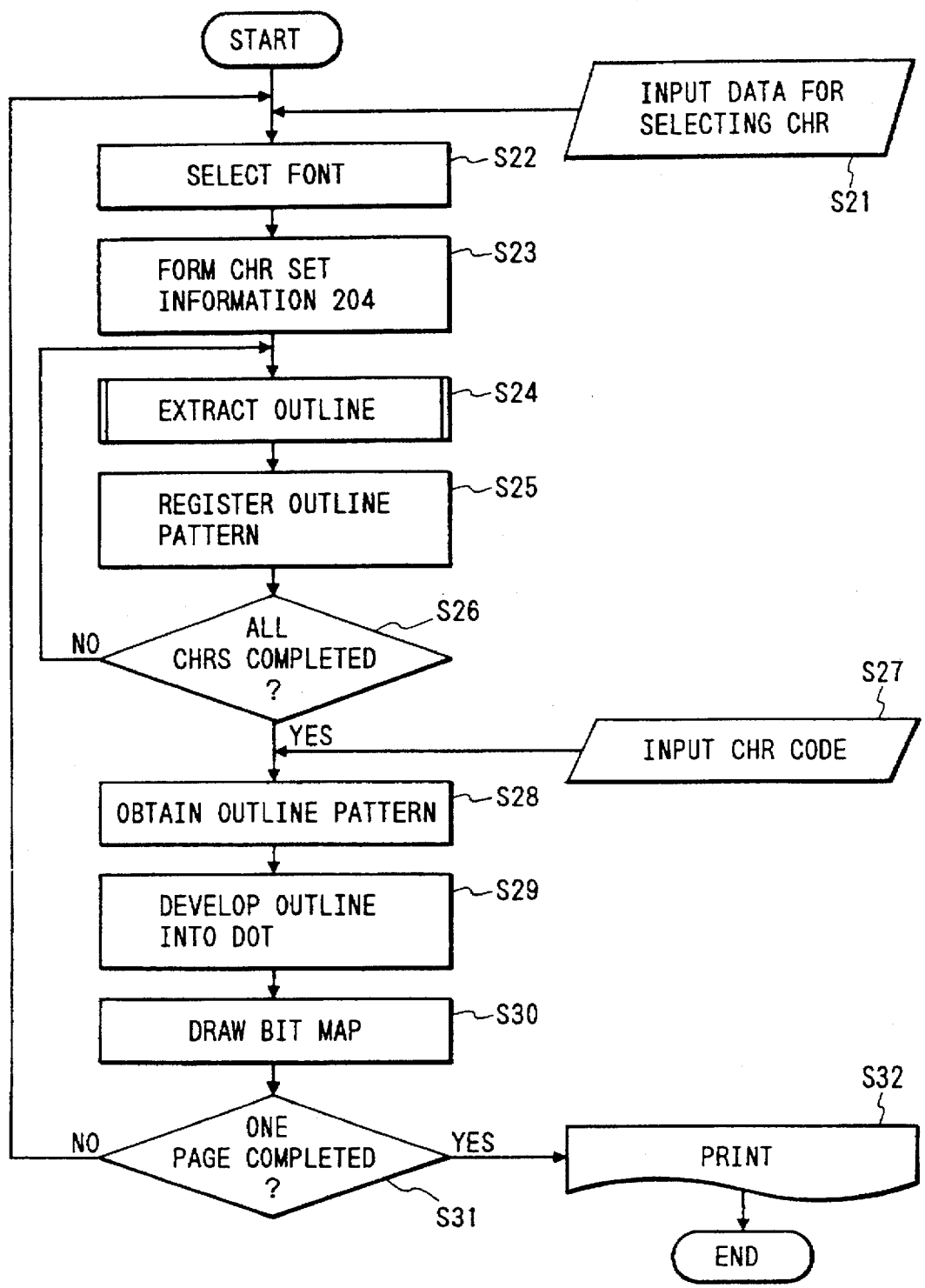
FIG. 5 is a flow chart showing printing processing in an LBP according to another embodiment of the present invention.

FIG. 5 is a flow chart showing printing processing by an LBP according to another embodiment of the present invention.

In step S21 in FIG. 5, character set information (Ming type, Gothic type, or the like) for selecting characters, and a character form (height and width) are input from the host computer 100. In step S22, dot pattern fonts stored in the ROM 102a originally incorporated in the printer are selected from the character set management table 201 on the basis of the input character set information. In this case, the character height and width of the character set information designated in step S21 may be different from those of attribute information stored in the management table 201. As will be described later, the dot pattern font is temporarily converted into an outline font, and thereafter, the outline font is developed to bit map data.

In step S23, as shown in FIG. 2, a character set information portion which stores a character type, a type face, and the like of the dot font is formed, and its address is stored in the pointer table 202 of the character set management table 201. In addition, attribute information such as a character width, a character height, a type face, and the like is stored in the attribute information storage 203. In step S23, the area of the character information portion 204 is assured, and its address is stored in the pointer table 202 of the character set management table 201. In this manner, the address of an outline font which is to be formed based on the dot pattern, and is to be registered in the registration memory 103 can be looked up from the character set management table 201.

In step S24, a dot pattern for one character is read out from the dot pattern fonts selected in step S22, and outline extraction processing of the pattern is executed to extract an outline of a character. Then, an outline font is generated on the basis of the outline information. The outline font formed in this manner is stored at the address of the registration memory 103 indicated by the character pointer 205 in the character set information portion 204 in step S25. This processing is repetitively executed until conversion of all the dot patterns to outline fonts, and registration of the outline fonts are completed in step S26.

After the outline fonts are formed and registered in this manner, the character code sent from the host computer 100 is read out from the receiving buffer 101 in step S27. In step S28, the character pointer, corresponding to the character code, of the character set information portion 204 selected in step S22 is looked up, thereby reading out the outline pattern font from the registration memory 103.

In step S29, the outline font is developed to a dot pattern in accordance with the character form input in step S21, and the resolution of the printer engine 106 (the content of the resolution memory 108), thus obtaining a desired dot pattern. The dot pattern obtained in this manner is written in the bit map memory 105 in step S30, thus generating image information of a character pattern. The above-mentioned processing is repeated until image data for one page are formed on the bit map memory 105 in step S31. When the image data for one page are formed on the bit map memory 105, the flow advances to step S32, and an image is recorded on a recording sheet by the printer engine 106 shown in FIG. 6.

As described above, according to this embodiment, when dot patterns are down-loaded, they can be converted in advance to outline fonts, and the outline fonts are registered. Thus, processing for converting a dot pattern into an outline font every time one character is received and printed can be omitted. Therefore, a time required for printing desired character patterns can be shortened.

In this embodiment, the printer has been exemplified as the character pattern output apparatus. However, the present invention is not limited to this, but may be applied to a display apparatus such as a CRT display.

As described above, according to the present invention, since outline fonts are formed based on dot patterns, and are registered, dot patterns having a size suitable for a character attribute can be displayed and output.

Still another embodiment will be described below. The same reference numerals in this embodiment denote the same parts as in FIG. 1, and a detailed description thereof will be omitted.

Figure 7:
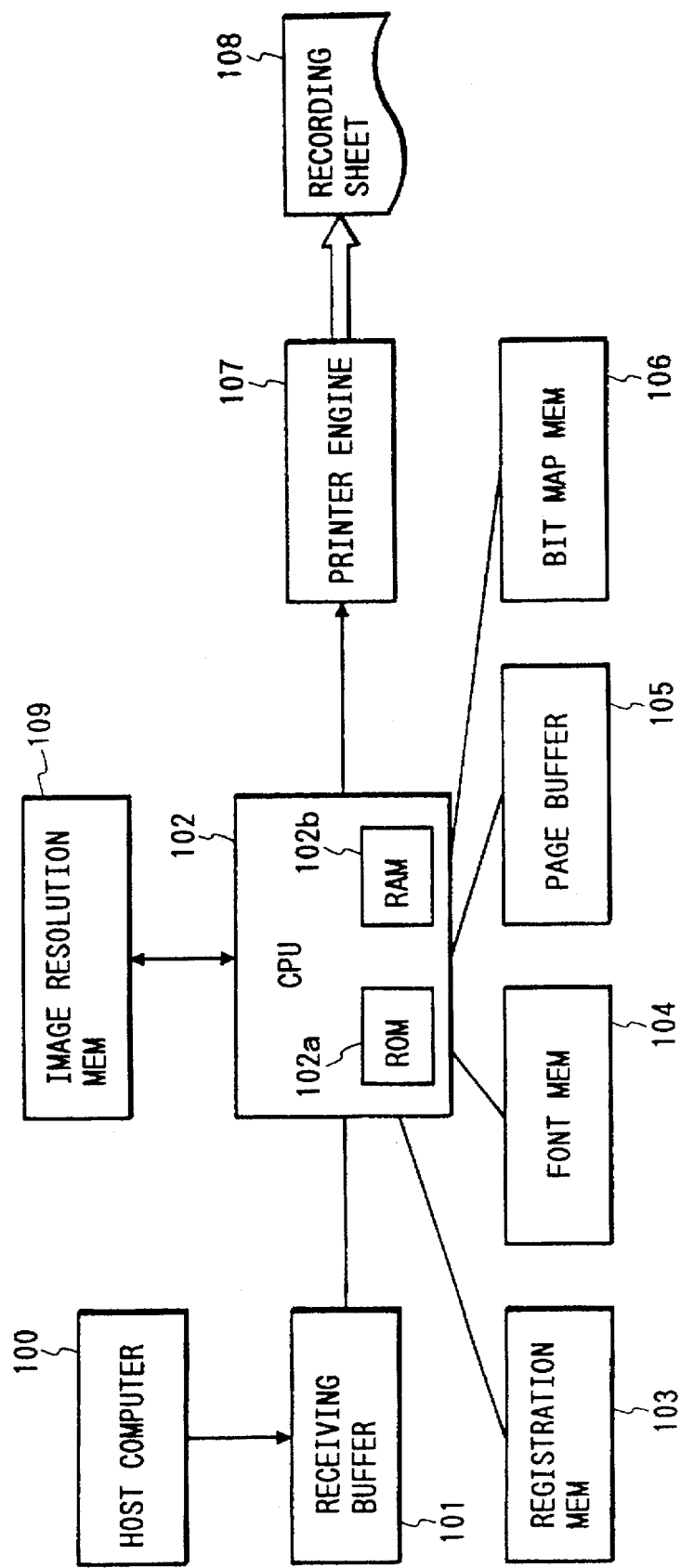
FIG. 7 is a block diagram showing an arrangement of a control unit for an LBP according to still another embodiment of the present invention.

In FIG. 7, a registration memory 103 stores dot pattern fonts. A font memory 104 stores outline fonts generated based on the dot pattern fonts stored in the registration memory 103, and dot fonts generated based on the outline fonts. A page buffer 105 stores data received from a host computer 100 in units of pages. A bit map memory 106 stores an output image for one page to be output to a printer engine 107. The printer engine 107 has an arrangement shown in detail in FIG. 6, and prints image data stored in the bit map memory 106 on a recording sheet 108. The recording sheet 108 is printed in this manner. A resolution memory 109 stores a current recording resolution of the printer engine 107.

With the above arrangement, when a dot pattern font is input from the host computer 100, it is registered in the registration memory 103, and is temporarily converted into an outline font. The converted outline font is then converted into a dot pattern according to another printing resolution of the printer engine 107, and the converted dot pattern is stored in the font memory 104.

For example, when the printer engine 107 can perform printing operations at 180 dpi and 360 dpi, if a character dot pattern which has a character size of 10 points (25 dots×25 dots) at 180 dpi is input, the dot pattern is temporarily converted into an outline font. Furthermore, a character dot pattern is formed using the outline font, so that the dot pattern can have a character size of 10 points (50 dots×50 dots) when it is printed at 360 dpi.

A case will be explained below wherein a character code is input from the host computer 100, a character size, a form, a printing resolution, and the like are instructed, and start of printing is then instructed. In this case, when a printing operation can be performed with the designated character size using dot patterns (10 points at 180 dpi, 25 dots×25 dots) registered in the registration memory 103, the input dot patterns are directly used, and are pattern-developed onto the page buffer 105.

On the other hand, when the resolution of the printer engine 107 is, e.g., 360 dpi, and the size of characters printed using the dot patterns in the registration memory 103 is different from the designated size (10 points), the dot patterns, which are already developed to 50 dots×50 dots using the outline fonts, are developed into bit map data.

Furthermore, when there are no dot patterns with which characters having the same size as the designated size (10 points) can be printed in correspondence with the resolution of the printer engine 107, an outline font stored in the font memory 104 and corresponding to the input character code is read out, and is converted into a dot pattern having a corresponding size. The dot pattern is developed into bit map data on the page buffer 105. In this manner, even when various character sizes and resolutions are designated, a printing operation can be performed with the suitable character size.

This operation will be described in detail below.

<Management of Font Data (FIG. 8)>

Figure 8:
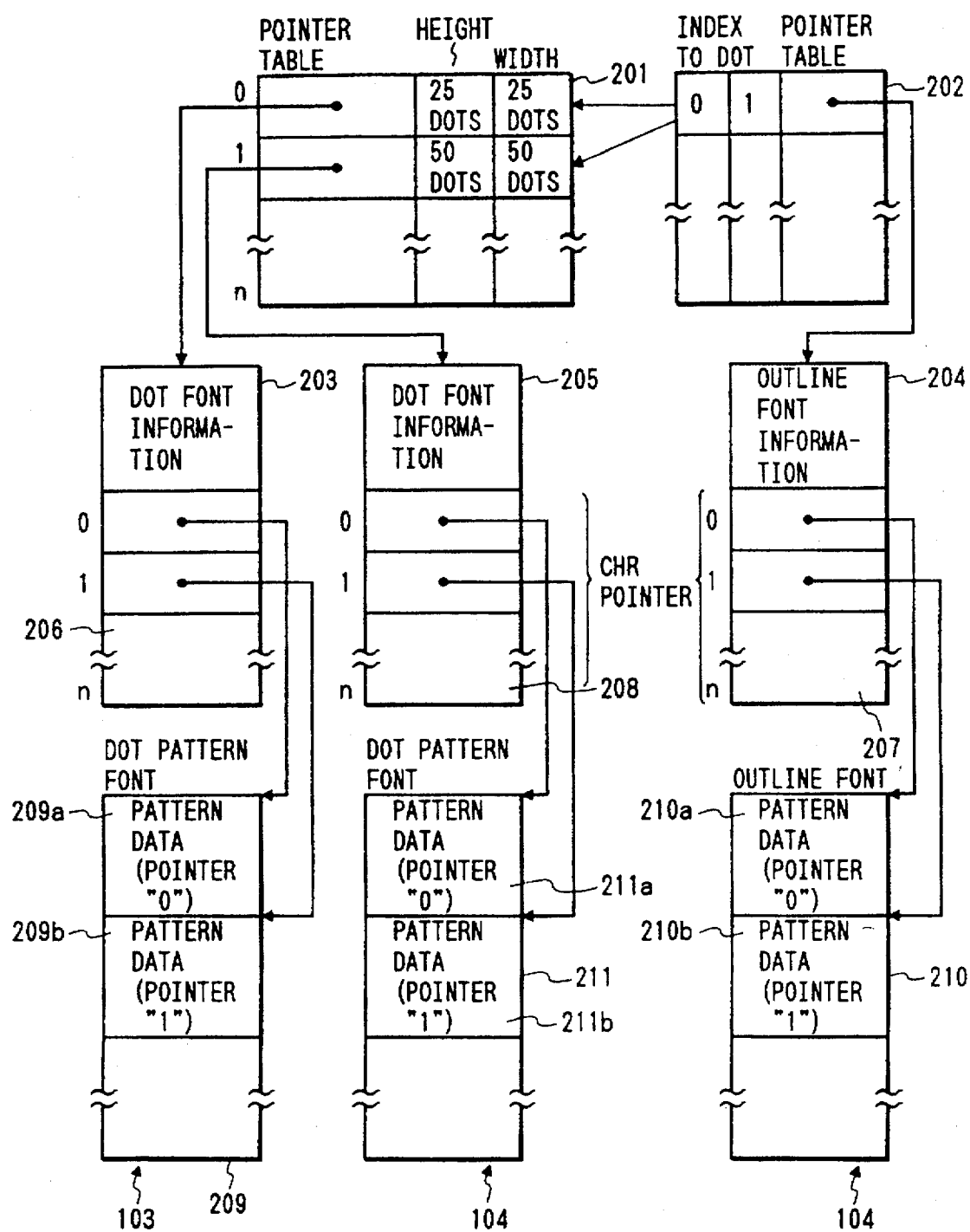
FIG. 8 is a view showing the relationship between a dot pattern table and an outline font table.

FIG. 8 shows an architecture of a management table for managing dot pattern fonts, and outline fonts formed based on the dot pattern fonts. This table is stored in a RAM 102b.

In FIG. 8, a dot font management table 201 manages all the dot pattern fonts including dot fonts which serve as original patterns upon formation of outline fonts. An outline font management table 202 manages only outline fonts formed based on the dot pattern fonts.

A dot font information portion 203 stores dot font information registered in the registration memory 103, and character pointers 206 for indicating character patterns corresponding to character codes. A dot pattern font 209 is one registered in the registration memory 103. For example, a dot pattern 209a is designated when the index of the dot font management table 201 is "0" (25 dots×25 dots), and the pointer (character code) of the font information portion 203 is "0", and a dot pattern 209b is designated when the pointer of the dot font information portion 203 is "1".

More specifically, for example, index "0" is used when received dot patterns (e.g., having a character size of 10 points at 180 dpi) are directly stored, and index "1" indicates dot patterns which can be printed to have the same size (10 points) as that of characters printed using the dot patterns of index "0" when the resolution of the printer engine 107 is 360 dpi.

A dot font information portion 205 has a different character size, and manages dot patterns stored in the font memory 104 and formed based on an outline font. This information portion 205 stores character pointers 208 for designating character patterns in one-to-one correspondence with character codes. A dot pattern font 211 is one stored in the font memory 104, and formed based on an outline font. In this case, a dot pattern 211a is designated when the index of the dot font management table 201 is "1" (50 dots×50 dots), and the pointer (character code) of the font information portion 205 is "0" like in the dot pattern font 209 described above, and a dot pattern 211b is designated when the pointer of the dot font information portion 205 is "1".

An outline font information portion 204 stores information of outline fonts formed based on the dot pattern fonts in the registration memory 103, and stored in the font memory 104, and character pointers 207 for indicating character patterns in one-to-one correspondence with character codes. An outline font 210 is one stored in the font memory 104. An outline font pattern 210a is designated when the character pointer is "0", and an outline font pattern 210b is designated when the character pointer is "1".

<Registration Sequence (FIG. 9)>

Figure 9:
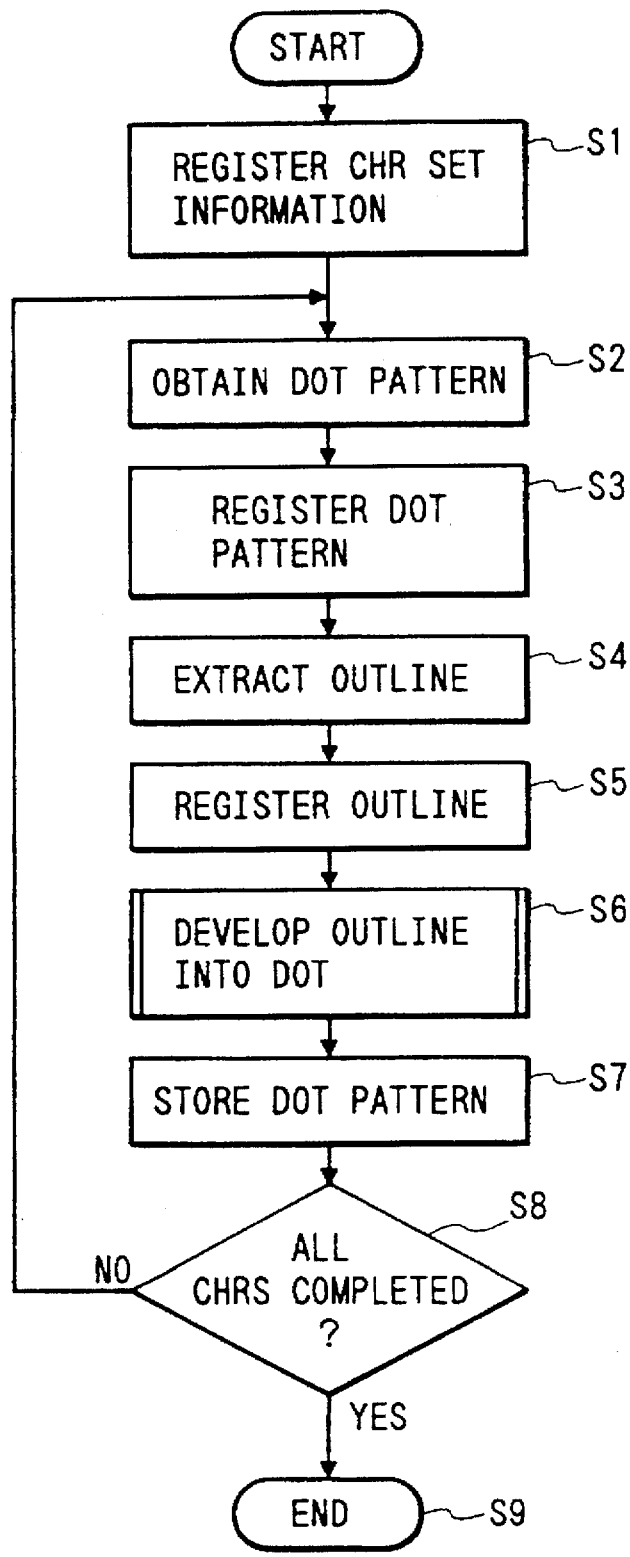
FIG. 9 is a flow chart showing character pattern registration processing in the LBP according to the embodiment shown in FIG. 7.

FIG. 9 is a flow chart showing a character pattern registration processing sequence in an LBP 600 of this embodiment. A control program for executing this processing is stored in a ROM 102a. Prior to this processing, dot pattern data to be registered in the registration memory 103 are transferred from the host computer 100, and are stored in a receiving buffer 101.

In step S1, an area of a character set information portion (the dot font information portion 203 in FIG. 8) for storing a character type, a type face, and the like of a dot font to be registered in the registration memory is assured, and its address is stored in the dot font management table 201. Similarly, the area of the outline font information portion 204 is assured, and its address is stored in the pointer table in the outline font management table 202. In this case, as shown in FIG. 8, the storage number (pointer number) of the dot font management table 201 is stored as an index (character size information) of the outline font management table 202 to the dot font management table. Furthermore, the value of the pointer of the dot font management table 201 is stored as an index, so that dot font information corresponding to a different resolution can be looked up using this table 202.

In this manner, the dot font pattern information portions 203 and 205, and the outline font information portion 204 formed based on the dot patterns are linked.

The flow then advances to step S2, and a dot pattern for one character is read out from the receiving buffer 101. In step S3, the readout pattern is registered in the registration memory 103. In this case, the start address of the registration memory 103, where the dot pattern font 209 is stored, is stored in the character pointer 206 of the dot pattern font information portion 203 in FIG. 8 to link the registration memory with the dot pattern font information portion, so that character codes can have one-to-one correspondence with character patterns.

The flow then advances to step S4. In step S4, the dot pattern font registered in the registration memory 103 is read out, and outline extraction processing of the dot pattern is executed to extract an outline point string of a character, thus forming an outline font. The outline font formed in this manner is stored in the font memory 104 as an outline font in step S5.

In this case, the start address of the font memory 104, where the outline font is stored, is stored in the character pointer 207 of the outline font information portion 204 to link the font memory with the outline font information portion, so that character codes can have one-to-one correspondence with character patterns.

The flow then advances to step S6, and a dot pattern having a size (50 dots×50 dots in the above-mentioned case) different from that of the dot patterns registered in the registration memory 103 is formed using the outline font registered in step S5. This is to print characters to have the same size as the character size designated by attribute information such as form information even when the resolution of the printer engine 107 is set to be a different value, as described above.

In step S7, the address of the font memory 104, where the dot pattern font formed based on the outline font is stored, is stored in the character pointer 208 of the dot font information portion 205. In this case, the storage number ("1" in FIG. 8) of the dot font font management table is set in the index of the outline font management table 202.

In this manner, the outline font information portion, and the dot font information portion formed based on the outline font are related to each other.

The above-mentioned processing is repeated until registration of all the character patterns stored in the receiving buffer 101 and development to the outline fonts are completed in step S8.

<Printing Processing (FIG. 10)>

Figure 10:
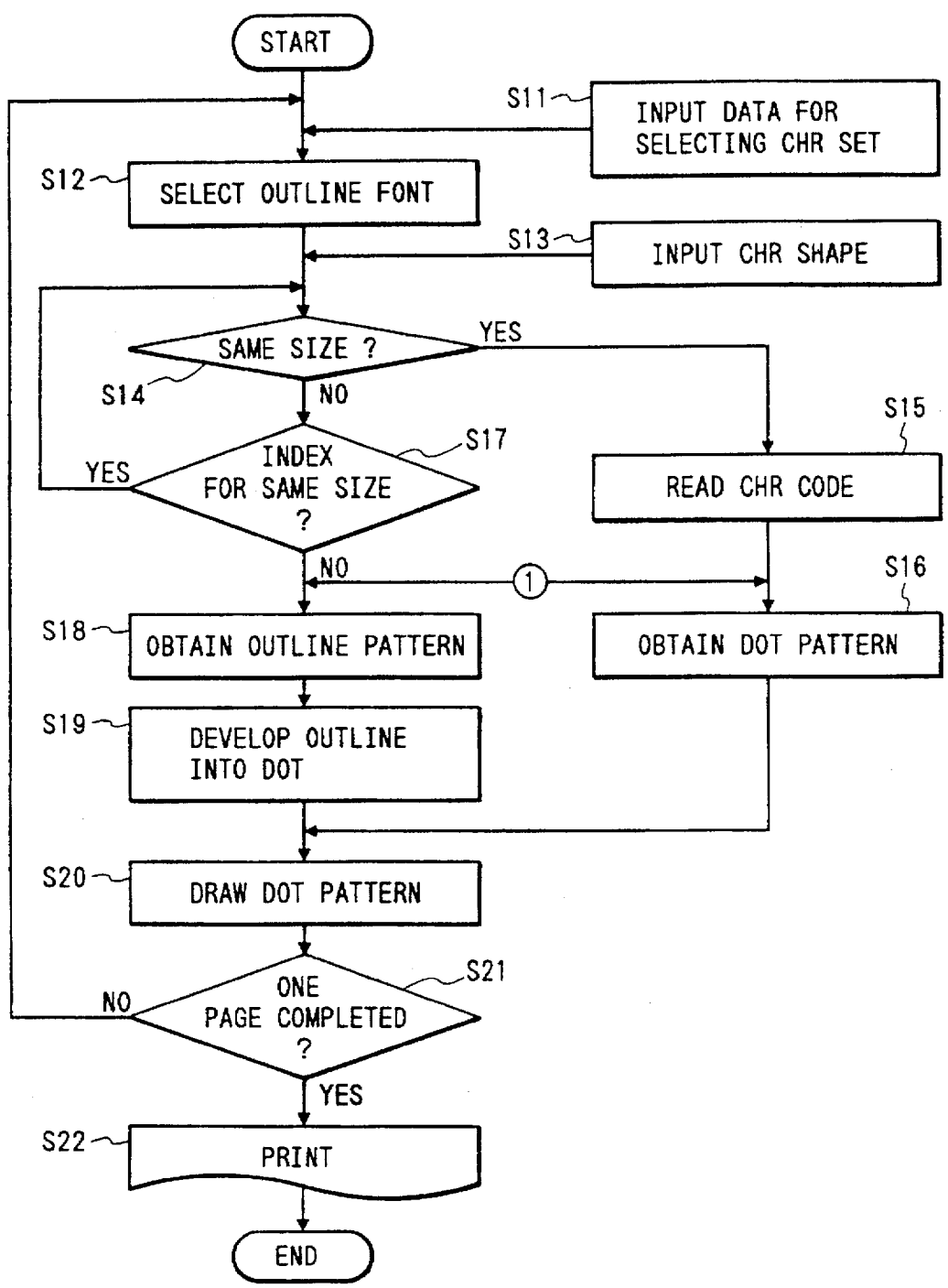
FIG. 10 is a flow chart showing printing processing in the LBP according to the embodiment shown in FIG. 7.

FIG. 10 is a flow chart showing a printing processing sequence for developing character codes input from the host computer 100 into pattern data, and printing the pattern data in practice. A control program for executing this processing is stored in the ROM 102a.

In step S11 in FIG. 10, character set information (Ming type, Gothic type, or the like) for selecting characters are input from the host computer 100. The flow advances to step S12 to select an outline font corresponding to the character code from the outline font management table 202 using the character set information. In step S13, a character form (a character height and width) is designated.

In step S14, the index of the outline font selected in step S12 to a dot character set, which index is stored in the outline font management table 202, is read out, and character height information and width information indicated by the readout index are read out from the dot font management table 201. It is then checked if the character size of dot pattern data registered in the table 201 is the same as the character form designated in step S13.

If the character size of dot pattern data is not the same as the character form, the flow advances to step S17 to check all the indices of the dot fonts of the outline font management table 202. All the indices are checked in step S17, and if a font having the same size is found, the flow returns to step S15. In step S15, a character code is read out from the receiving buffer 101, and in step S16, a dot pattern corresponding to the readout character code is read out from the font memory 104 or the registration memory 103. The flow then advances to step S20, and the readout dot pattern is developed onto the bit map memory 106.

On the other hand, if it is determined in step S17 that the character sizes of registered dot pattern data cannot be printed in the same character size in consideration of the character form designated in step S13 and the resolution after all the indices are read out, the flow advances to step S18, and outline font information corresponding to the character code is read out from the font memory 104 in accordance with the character pointer 207 stored in the outline font information portion 204.

The flow then advances to step S19, and the readout outline font information is developed to form a character dot pattern corresponding to the character form designated in step S13 and the printing resolution.

In step S20, the dot pattern obtained in this manner is developed into bit map data on the bit map memory 106, thereby generating image information of the character pattern. If bit map data for one page is formed in step S21, the flow advances to step S22, and an image is printed on a recording sheet using the printer engine described above with reference to FIG. 6.

In this manner, according to this embodiment, when a dot pattern font is registered, an outline font is formed on the basis of the dot pattern, and a dot pattern having another size according to a resolution of a recording unit is formed based on the outline font and is registered in advance. Thus, when a printing operation of characters having a size other than that of an original dot pattern size is designated, the printing operation can be performed using the new dot pattern. Therefore, a printing processing time can be shortened.

In this embodiment, an outline font is formed based on a dot font registered by, e.g., the host computer. However, the present invention is not limited to this. For example, an outline font may be formed on the basis of a dot font stored in, e.g., an internal ROM of a printer, and the same processing as described above may be executed.

In the flow chart shown in FIG. 9, when a dot pattern is registered, generation of an outline font (step S4), registration of the outline font (step S5), generation of a dot font (step S6), and storage of the dot font (step S7) are executed. For example, these steps may be executed when the resolution of the printer engine is designated by the host computer 100, and the size of a character printed using a currently stored dot pattern becomes different from the designated size.

As described above, according to this embodiment, a dot pattern is converted into an outline font, and a dot pattern corresponding to a dot pattern having a size different from an original dot size is formed based on the outline font, and is registered, so that a time required for forming a character pattern can be reduced, and a printing speed can be increased.

As described above, according to the present invention, an outline font is formed based on a dot pattern, and a dot pattern having a size according to a resolution of a recording unit is formed based on the outline font, and is registered. Thus, even when a printing resolution is changed, a high-speed printing operation can be performed. Note that the dot pattern may be an externally input down-load font.

What is claimed is:

1. An output apparatus comprising:

first storage means for storing character font information as a dot pattern;

outline generating means for generating an outline font on the basis of the stored dot pattern;

outline font storage means for storing the outline font generated by said outline generating means;

dot pattern generating means for generating a character dot pattern having a size corresponding to form information;

second storage means for storing the generated character dot pattern formed by said dot pattern generating means;

third storage means for storing information representing a plurality of resolutions available in said output apparatus; and output means for outputting, in the case that the dot pattern stored in the first storage means does not have the size corresponding to the form information, the generated character dot pattern stored in said second storage means, having the size corresponding to the form information, and having one of the plurality of resolutions represented by the information stored in said third storage means.

2. An apparatus according to claim 1, further comprising means for visualizing the dot pattern output by said output means.

3. An apparatus according to claim 2, wherein said visualizing means comprises a printer.

4. An output method comprising the steps:

generating outline data on the basis of a first dot pattern;

generating a second dot pattern having a corresponding size of the outline data in accordance with form information and an output resolution; and outputting the second dot pattern if the first dot pattern does not correspond to a dot pattern to be output having the output resolution.

5. An output apparatus comprising:

storage means for storing character information, an output size, and an output resolution of the character information;

scalable font generating means for generating a scalable font on the basis of dot pattern font information;

dot pattern generating means for generating a dot pattern on the basis of the generated scalable font and the character information, the output size, and the output resolution stored in said storage means; and output means for outputting the dot pattern after said dot pattern has been generated by said dot pattern generating means, wherein the dot pattern generated by said dot pattern generating means is different in size from the dot pattern font information.

6. An apparatus according to claim 5, further comprising means for visualizing the dot pattern output by said output means.

7. An apparatus according to claim 6, wherein said visualizing means comprises a printer.

8. An information processing system comprising:

a computer which outputs character information; and an output apparatus comprising:

first storage means for storing character font information as a dot pattern in correspondence to the character information output by said computer;

outline generation means for generating an outline font on the basis of the stored dot pattern;

outline font storage means for storing the generated outline font generated by said outline generating means;

dot pattern generating means for generating a character dot pattern having a size corresponding to form information;

second storage means for storing the generated character dot pattern formed by said dot pattern generating means;

third storage means for storing information representing a plurality of resolutions available in said output apparatus; and output means for outputting, in the case that the dot pattern stored in said first storage means does not have a size corresponding to the form information, the generated character dot pattern stored in said second storage means, having the size corresponding to the form information, and having one of the plurality of resolutions represented by the information stored in said third storage means.

9. An output method carried out in an output apparatus having a first memory for storing character font information as a dot pattern and a second memory for storing information representing a plurality of resolutions available in the output apparatus, said method comprising the steps of:

generating an outline font on the basis of the dot pattern stored in the first memory;

storing the generated outline font in a third memory;

generating a character dot pattern having a size corresponding to form information;

storing the generated character dot pattern in a fourth memory; and in a case that the dot pattern stored in the first memory does not have the size corresponding to the form information, outputting the generated character dot pattern stored in the fourth memory, having the size corresponding to the form information, and having one of the plurality of resolutions represented by the information stored in the second memory.

10. A computer-readable memory medium storing computer-executable process steps carried out in an output apparatus having a first memory for storing character font information as a dot pattern and a second memory for storing information representing a plurality of resolutions available in the output apparatus, the steps comprising:

a generating step to generate an outline font on the basis of the dot pattern stored in the first memory;

a storing step to store the generated outline font in a third memory;

a generating step to generate a character dot pattern having a size corresponding to form information;

a storing step to store the generated character dot pattern in a fourth memory; and in a case that the dot pattern stored in the first memory does not have the size corresponding to the form information, an outputting step to output the generated character dot pattern stored in the fourth memory, having the size corresponding to the form information, and having one of the plurality of resolutions represented by the information stored in the second memory.

* * * * *